United States Patent [19]

Heavey

[11] Patent Number: 5,164,655
[45] Date of Patent: Nov. 17, 1992

[54] 12-24 VOLT POWER SYSTEM

[75] Inventor: Frederick D. Heavey, St. Paul, Minn.

[73] Assignee: Dimensions Unlimited, Inc., St. Paul, Minn.

[21] Appl. No.: 740,055

[22] Filed: Aug. 5, 1991

[51] Int. Cl.$^5$ ............................................. H02J 7/14
[52] U.S. Cl. ......................................... 322/8; 322/90; 320/15; 307/16
[58] Field of Search ................... 320/6, 15, 17; 322/7, 322/8, 90; 307/16, 149, 150

[56] References Cited

U.S. PATENT DOCUMENTS

| | | | |
|---|---|---|---|
| 2,913,587 | 11/1959 | Gebhard | 290/37 |
| 4,041,363 | 8/1977 | Scheidler | 320/15 |
| 4,044,293 | 8/1977 | Follmer | 320/15 |
| 4,047,088 | 9/1977 | Himmler | 320/6 |
| 4,816,736 | 3/1989 | Dougherty et al. | 320/17 |
| 4,849,682 | 7/1989 | Bauer et al. | 320/15 |

OTHER PUBLICATIONS

Siemen's Data Book of the PROFET, pp. 126-143.
Power Inverter Application Note, by Frederick D. Heavey, Dimensions Unlimited, Inc. Publication.
Dimensions Unlimited, Inc. advertising brochure.

Primary Examiner—William H. Beha, Jr.
Assistant Examiner—Adolf Berhane
Attorney, Agent, or Firm—Leone & Moffa

[57] ABSTRACT

A dual state power system utilizing power drivers to switch an alternator from 12 volt to 24 volt charging. A 12-24 volt alternator regulator charges a 12 volt battery or a 24 volt battery depending on the position of a mode switch. The invention allows the use of one alternator-/engine combination to charge either a 12 volt or 24 volt system. The invention uses a 12 volt mode priority to override a 24 volt charging mode. The 24 volt charging mode is interrupted to provide voltage to a 12 volt battery for a predetermined time period. A voltage controller drives a smart electrical current driver which controls the output of an alternator. A reset circuit determines from system parameters reported from system components whether the charging system to a reset error circuit whether or not the alternator is operating correctly. A sense lamp driver indicates to the user that the system is in a non functioning state. A 12 volt mode lock-out and 24 volt mode lock-out isolates the 12 volt or 24 volt modes where appropriate. An open circuit sensor drives a reset circuit that prevents an open circuit from damaging the system. The reset shuts off alternator fields for many conditions including a fault in the alternator or the two power drivers or an open circuit.

15 Claims, 3 Drawing Sheets

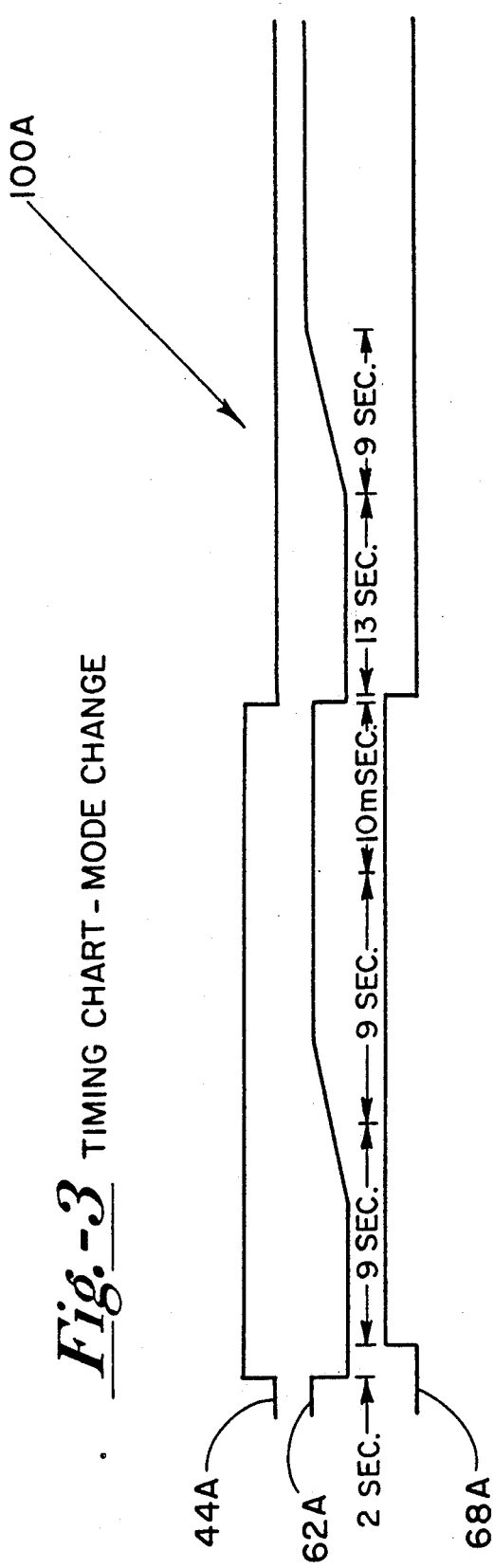

12-24 VOLT POWER SYSTEM

This invention relates to an apparatus and method of charging a dual voltage system using a single alternator, and more particularly, for a 12-24 volt charging system that utilizes smart power controllers.

BACKGROUND OF THE INVENTION

Prior art 24 volt charging systems have been used to charge batteries that have been installed in vehicles to perform various functions. One particular function is the operation of a 24 volt DC to AC converter or inverter. In the prior art a 24 volt battery is installed in a vehicle to support the 24 volt DC to AC inverter. The 24 volt battery system needs to be periodically recharged to maintain the output of the inverter. The prior art method of recharging the 24 volt battery system derives from the availability of the vehicles 12 volt battery charger. The prior art configured two 12 volt vehicle battery's in a stack such that they can be reconfigured for use as either a 24 volt circuit or in a 12 volt circuit. This configuration was achieved using solenoids in such a way that the vehicle's 12 volt alternator could charge both batteries in parallel.

There are a number of drawbacks to the prior art. A separate battery pack is needed to effectively power the inverter because the 24 volt battery must be close to the inverter. In many applications the battery pack and the inverter should be less than 3 feet apart. The prior art, therefore, was not able, absent the inclusion of an entirely separate 24 volt alternator, to utilize the 12 volt alternator to charge a 24 volt battery pack and meet the cable length requirement. Even if desired it is typically not feasible or not desirable to add an additional vehicle alternator. An additional alternator increases the weight of the system and decreases the reliability of the system as well as increasing the cost of the system. In many or most instances it is not possible due to space constraints to add another alternator.

Therefore, due to the inherent limitations of the prior art it is the motive of the invention to provide a compact and reliable dual state, 12 and 24 volt charging system utilizing a single 12 volt alternator.

SUMMARY OF THE INVENTION

The invention provides a 12-24 volt alternator regulator that charges a 12 volt battery or a 24 volt battery depending on the position of a mode swich. The mode can be manually or automatically selected. The invention uses a 12 volt mode priority subsystem while in 24 volt mode. During 12 volt mode priority the 24 volt charging is interrupted to provide voltage to the 12 volt battery for a predetermined time period. The dual state system uses a voltage controller which rives a smart current driver which controls the output of an alternator. Numerous failure conditions are detected. An open circuit sense detector drives a reset line that prevents an open circuit from damaging the system. The reset shuts off alternator fields for many conditions including a fault in the alternator, a fault in either of the two power drivers or an open circuit. A 12 volt mode lock-out and 24 volt mode lock-out isolates the 12 volt or 24 volt modes where appropriate.

It is one object of the invention to provide an improved under hood voltage regulator using one alternator to recharge a 12 or 24 volt battery.

It is a further object of the invention to provide a separate 24 volt battery pack that is close in proximity to an inverter.

It is yet a further object of the invention to provide an improved 12-24 volt charging system that utilizes one alternator.

It is a further object of the invention to use dual smart power drivers to control the 24 or 12 volt recharging.

It is yet a further object of the invention to provide an improved 12-24 volt charging system that utilizes a status lamp for reporting the condition of the generating system.

It is another object of the invention to provide an improved 12-24 volt charging system that employs diodes back to back to provide two grounds for redundancy.

It is a further object of the invention to provide a solenoid to switch from 12 volt mode to 24 volt mode in an improved 12-24 volt battery charging system.

It is a further object of the invention to provide an improved 12-24 volt charging system that utilizes lock-out diodes that isolate the 12-24 volt system voltages in a particular mode.

It is yet a further object of the invention to provide an improved 12-24 volt battery charging system that provides for a 12 volt priority interrupt that allows the recharging of the 12 volt battery while in 24 volt mode.

It is a further object of the inventic,n to provide a reset that shuts off alternator fields for a open c:ircuit in an improved 12-24 volt charging system.

It is a further object of the invention to provide a alternator field shut off for a smart driver fault condition in an improved 12-24 volt charging system.

It is yet a further object of the invent:ion to provide a soft reset capability in an improved 12-24 volt charging system that will enable the system to be restarted after a component cools off.

It is a further object of the invention to provide an improved 12-24 volt charging system that automatically goes into 24 volt mode charging when a 120 volt converter begins to be used.

It is yet a further object of the invention to provide a pulse width modulation signal to control an alternator charge current in an improved 12-24 volt charging system.

It is yet a further object of the invention to provide 400 Hz cycle for a pulse width modulation control signal in an improved 12-24 volt mode charging system.

It is a further object of the invention to provide a 12 volt mode manual override for an improved 12-24 volt charging system.

Other objects, features and advantages of the present invention will become apparent to those skilled in the art through the Description of the Preferred Embodiment, Claims, and drawings herein wherein like numerals refer to like elements.

BRIEF DESCRIPTION OF THE DRAWINGS

To illustrate this invention, a preferred embodiment will be described herein with reference to the accompanying drawings. The preferred embodiment concerns an apparatus and method for charging a dual 12-24 volt battery system.

FIG. 3 is a timing diagram of the mode changes in the 12-24 volt charging system used in a vehicle 12-24 circuit.

DESCRIPTION OF THE PREFERRED EMBODIMENT

Figure 1:
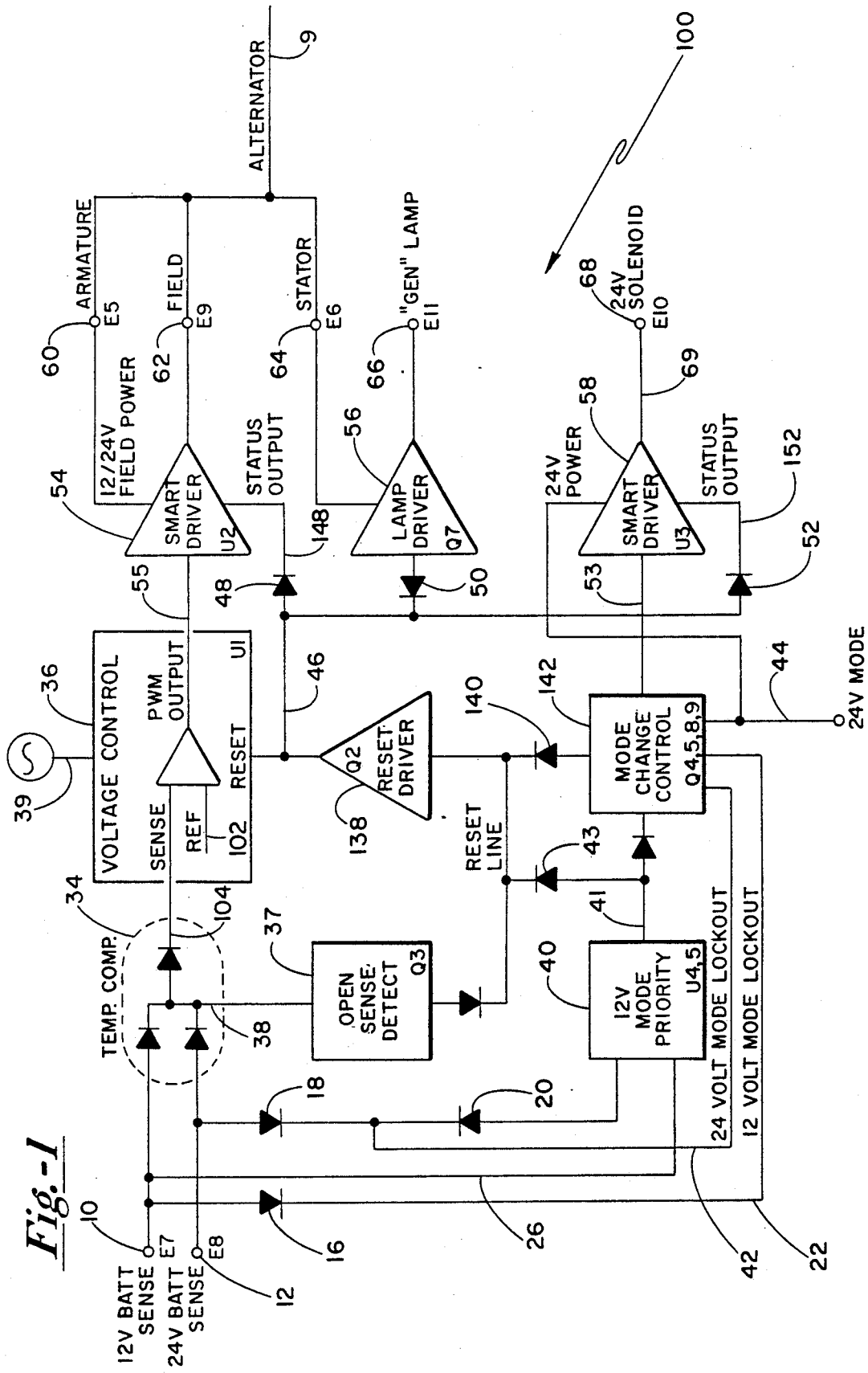
FIG. 1 shows a schematic block diagram of the 12-24 volt charging system showing the circuit componerts.

Referring now to FIG. 1 which shows a schematic block diagram of the improved 12-24 volt charging system. The 12-24 volt charging system utilizes a number of advanced integrated circuit features that perform a variety of monitoring and control functions. The new 12-24 volt charging system of the method and apparatus of the invention provides a dual power driver system whereby a single vehicle alternator can be used to charge either a standard 12 volt vehicle battery or a additional 24 volt auxiliary power battery. The apparatus of the invention employs a number of fail-safe features that prevent system failure. Various system parameters such as open sense, current detection, stator current detection and power driver status output monitoring provide a number of status signals by which the apparatus of the invention determines whether or not the voltage control output needs to be reset. The apparatus of the invention provides a number of power logic signals that indicate the mode of operation of the invention. Logic signal line 44 provides an indication of 24 volt mode. If logic line 44 attains a voltage level of 24 volts this indicates to the mode change control block 142 that the system is requesting 24 volt mode. The invention has two modes, a 24 volt mode for charging the 24 volt battery and a second 12 volt mode for charging the 12 volt battery. The 24 volt mode signal line 44 can be driven automatically, for example, by an inverter or manually by an operator. The signal line 44 indicates that the user or other device would like to change the application of the output of the vehicle alternator 9 to charge the 24 volt battery instead of a 12 volt battery. This will essentially double the output from 12 volts to 24 volts.

The change in 12 to 24 volt mode of operation occurs in a predetermined sequence in the apparatus of the invention. The sequence is implemented by dual power drivers 54 and 58. The field power driver 54 provides the current to control the alternator field 62. The second power driver 58 provides a control signal to switch between the 12 and 24 volt batteries. The field power driver 54 always drives the field using a predetermined oscillator 39 to modulate a pulse width modulation output 55.

The voltage is controlled using pulse width modulation by a voltage control chip 36. A good example of a voltage control chip suitable for use in the method of the invention is the Regulating Pulse Width Modulator Model Number SG1526B, SG2526B and SG3526B from Silicon General of Garden Grove, Calif. The chip is a high performance pulse width modulator for switching power supplies incorporating a bandgap reference circuit, improved undervoltage lockout, lower temperature coefficients, faster shutdown response, double pulse suppression logic, low shoot through current and faster rise and fall times. A full description of the chips can be found in the manufactures datasheets.

The voltage controller 36 uses a preset reference that senses the actual battery voltage on either input lines 10 or 12. Signal line 10 senses the 24 volt battery and signal line 12 senses the 12 volt battery. The sense lines 10, 12 provide the primary sense signals that are fed to the temperature compensated circuit 34 that provides both an open sense detect signal 38 to the open sense detect logic 37 and a voltage sense signal 104 to the voltage control circuits 36. The 12 volt battery sense line 10 and 24 volt battery sense line 12 are fed and adjusted to a relative 5 volt reference in temperature compensation circuit 34.

The 12 volt battery sense line 10 is fed through lock-out diode 16 to the 12 volt mode lock-out sense line 22 which provides the mode change control logic 142 with the current voltage level of the 12 volt battery system. Similarly, the 24 volt battery sense line 12 is fed through an alternative lock-out diode 18 which is protected by an additional diode 20 and provides current to the 24 volt mode lock-out signal line 42 which also connects to the mode change control logic 142. The lock-out diodes 16 and 18 provide a method of isolating the 12 or 24 volt battery voltage levels so that the 12 volt sensing line 10 is not always driven by the 24 volt sense line 12. This prevents a false reading of system voltage.

A power driver 58 provides a solenoid 68 with a control signal. The solenoid's 68 purpose is to switch the output of the alternator 9 either to the 12 volt battery or to the 24 volt battery. The invention therefore, is controlling two separate entities, the output of the alternator 9 and the destination of the output of the alternator 9, whether to the 12 volt battery or the 24 volt battery.

A mode priority circuit 40 has a first input connected to one terminal of diode 20 and a second input connected to the 12 volt battery sensing signal 10 through line 26. The mode priority circuit has an output 41 connected to a mode priority input of mode change control logic 142. Output 41 is also connected through a diode 43 to an input of a reset driver 138. The mode priority circuit 40 operates to override the mode control signal on logic signal line 44 by supplying a voltage level priority output signal on line 41 to the mode change control logic 142. The mode change control logic 142 responds to the first voltage level priority output signal by providing a responsive signal on line 53 to an input of dual power driver 58 which responds by sending control signal 69 to switch the solenoid to the 12 volt battery, in this example. The 12 volt mode priority is activated to interrupt the battery charging system when the 12 volt battery requires charging while the system is in the 24 volt mode, for example.

In the operation of the 12-24 volt charging circuit of the invention, the sequence of events that occur after the 24 volt signal line 44 is driven to 24 volts illustrates the method of charging of the invention. Initially, the mode change control logic deadens the alternator field 62 effectively turning off the alternator 9. The next operation is to switch the 24 volt solenoid such that the 24 volt battery will be charged from the alternator 9. The 24 volt solenoid line 69 is used such that it provides a fail safe. If 24 volts are not provided as the output of the system, then it is not possible to switch the solenoid 68. By first shutting off the alternator 9 a switching of the solenoid 68 will cause no arcing because the solenoid switch is not carrying a current. This provides increased system safety because there will be no arcing or sparking of the solenoid 68. After the solenoid 68 is pulled there is initiated a brief predetermined delay to accomplish the soft start sequence of the 24 volt mode. In the soft start sequence the alternator field 62 is soft started. The soft start logic provides a predetermined current profile to protect the circuit elements in the charging system.

The power drivers are available from the Siemens Company as the PROFET model number BTS 4XX and BTS 5XX. The power drivers are a semiconductor power chip with MOSFET outputs and onboard logic. The power drivers have an unusual number of fail safe mechanisms onboard. It has overvoltage detection, undervoltage detection, open sense detection and over current detection. The principle use of the power driver is for use in passenger vehicles, principally the solenoids and the motors for the power windows and power locks. The chip is able to intercept a fault or a short and shut down and protect the device it is operating. The power drivers 54, 58 do not require protection circuitry. The chip also provides a status output for faults which is found in the schematic of FIG. 1 on line 148 and 152. A full description of the chips can be found in the manufactures datasheets.

In the apparatus of the invention the faults on line 148 and 152 are fed through buffers 52 and 48 to common status line 46. The invention provides a lamp driver 56 that will drive a dashboard lamp that indicates when the alternator 9 is providing an under current through the stator 64. The "gen" lamp 66 signal is provided as the output of the lamp driver 56. The causes of the gen lamp 66 activating could either be an open sense wire on the battery sense or it could be an over temperature condition.

The pulse width modulation voltage control 36 provides a pulse modulated signal 55 to the power driver 54. The pulse has a constant frequency that is determined by oscillator 39 and the width of each pulse controls the output of the power driver 54. For example, if a large current is required as the output of the power driver field 62 the pulses stay up for a long time, perhaps for the entire duration of the cycle. If the output of the power driver 54 is required to be low then the pulses stay up for just a small time approaching just spikes occurring at the frequency of the pulse width modulation signal 55.

The voltage controller will constantly compare the voltage from the 12 volt battery sense 10 and the 24 volt battery sense 12 to a reference voltage provided internally on the chip at 102. This provides a closed loop control mechanism by which the output of the system is constantly monitored while the width of each pulse is constantly adjusted.

The accuracy and resolution of the adjustment of the pulse width modulation is determined by the period of the pulse width modulation signal. In this embodiment of the invention a 400 Hz signal is used as the primary pulse frequency. Those skilled in the art will recognize that a 400 Hz pulse width modulation signal is given as an example and not by way of limitation and that other pulse width modulation frequencies could also be used.

The voltage controller 36 provides a reset condition that when activated prevents the pulse width modulation signal 55 from being provided at all. This reset signal 46 is driven by reset driver 138. A number of different conditions can drive the reset line high including the soft start from the mode change control logic 142.

The 12-24 volt mode charging system of the apparatus of the invention provides a way of dynamically compensating for most variations in alternator 9 output depending upon whether the system is in 12 volt mode or 24 volt mode by feeding back a sensed voltage through a temperature compensating voltage dividing network to a voltage control pulse width modulated output system. The pulse width modulating output provides a power driver with pulses that are converted to current that excite the alternator field. Thus the invention provides a way of dynamically monitoring the various modes of the 12-24 volt charging system.

Now that the voltage supply of the method of the invention has been described the use of the voltage supply apparatus will be described as installed in a vehicle utilizing a 24 volt power inverter. While using a 24 volt power inverter the need will arise to recharge the dual 12 volt batteries or 24 volt battery pack that powers the 24 volt power inverter.

Figure 2:
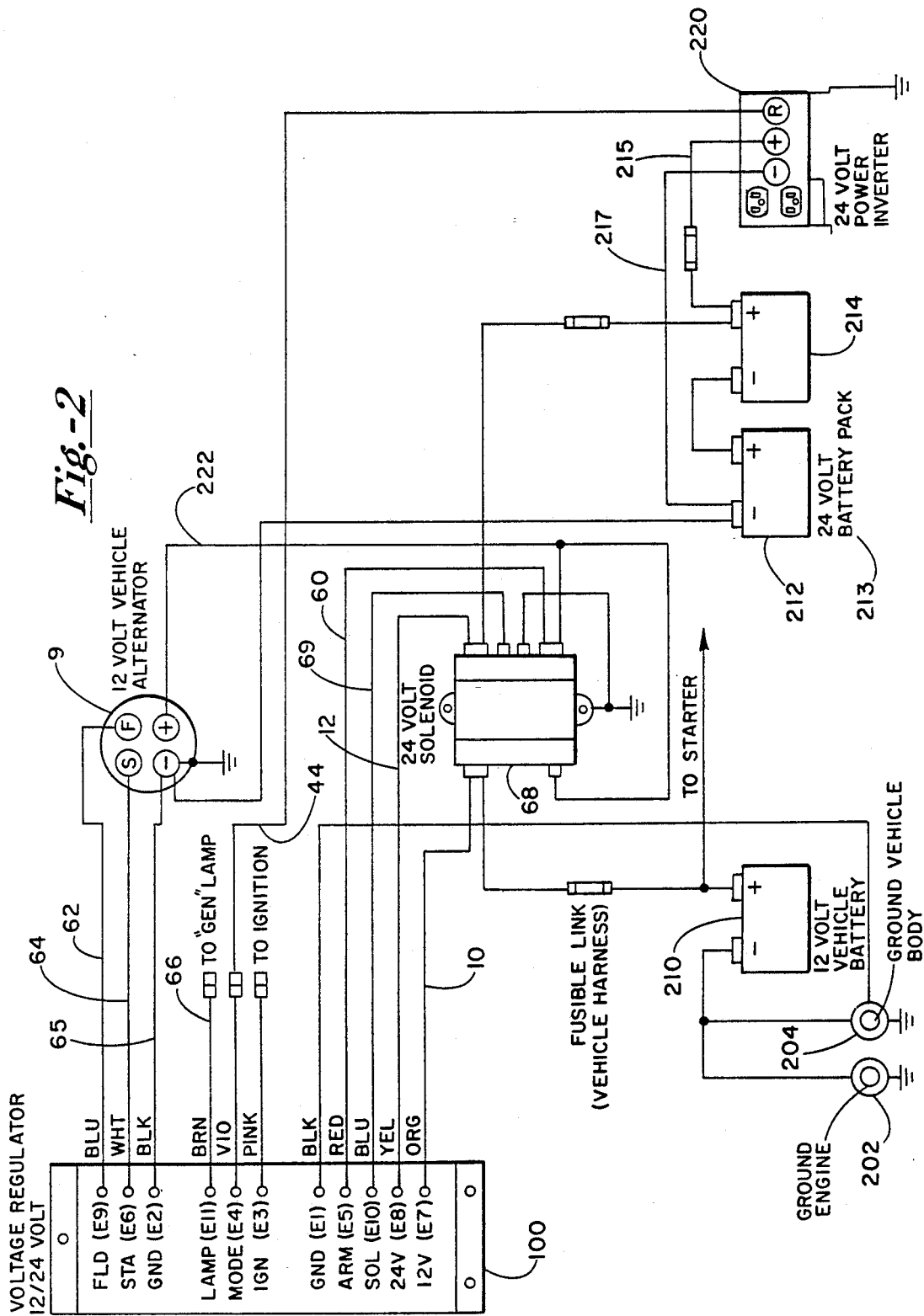
FIG. 2 is a schematic diagram of the 12-24 volt charging system used in a vehicle 12-24 circuit.

FIG. 2 shows the method of the invention used to charge dual 12 volt batteries 212 and 214 which comprise the 24 volt battery pack. The 24 volt power inverter 220 can be seen with a positive connection and a negative connection 215 and 217 respectively. The mode select line 44 is connected from the power inverter to the voltage regulator 100. The mode select line determines which mode whether charging in 12 volt mode or 24 volt mode the voltage regulator will be operating. The vehicles 12 volt alternator 9 can be shown connected to the 24 volt battery pack 212 and connected to the output of the voltage regulator 100. The field line 62 and stator line 64 as well as ground 65 can be seen in FIG. 2. The voltage regulator operates to control the alternator output depending on the mode set on line 44. The 12 volt vehicle battery 210 can be seen connected to both the vehicle ground 204 and engine ground 202. The 12 volt vehicle battery 210 is connected to 12 volt line 10 on 24 volt solenoid 68.. The 24 volt solenoid is connected to the 24 volt battery pack through 24 volt line 12. The 24 volt solenoid acts to switch between the 24 volt battery pack 213 and the 12 volt battery 210. It can be seen from FIG. 2 that the use of the voltage regulator method and apparatus of the invention is very efficient and simple and can be readily adapted to any vehicle that can ordinarily handle a 24 volt battery pack and 24 volt power inverter. In a typical vehicle the 12 volt vehicle alternator 9 and 12 volt vehicle battery 210 is already included and the only components that are necessary to accomplish the additional function of recharging a 24 volt battery pack from the vehicle alternator 9 is the inclusion of the voltage regulator 100 of the invention and the 24 volt solenoid 68.

Now referring to FIG. 3 which shows a detailed timing chart of the mode change of the method and apparatus of the invention. The state of the 24 volt mode line 44 is plotted as graph 44A. The state of the Field output 62 is plotted as graph 62A. And the state of the 24 volt solenoid is shown as 68A. The timing chart 100A shows that as the mode changes from 12 volt mode to 24 volt mode the field output 62 of the power driver 54 drops to zero. After 2 seconds the 24 volt solenoid 68 changes state and after 11 seconds the output of the power driver 54 ramps over a 9 second period to full output. The change from 24 volt mode to 12 volt mode sees the output 62 of the power driver 54 drop to zero again. After 0.1 seconds the 24 volt solenoid 68 changes state and after 13 seconds the output of the power driver 54 ramps over a 9 second period to full output. The cycles repeat for further changes of state.

The invention has been described herein in considerable detail in order to comply with the Patent Statutes and to provide those skilled in the art with the information needed to apply the novel principles and to construct and use such specialized components as are required. However, it is understood that the invention can be carried out by specifically different equipment and devices, and that various modifications, both by equipment details and operating procedures, can be accomplished without departing from the scope of the invention itself.

What is claimed is:

1. A two state power apparatur having a first voltage level and a second voltage level comprising:
   a. a mode control signal having a first state and a second state;
   b. a first voltage output circuit;
   c. a second voltage output circuit;
   d. an alternator means for generating electrical current at a charge voltage level having an armature winding, a field winding and a stator winding, wherein the alternator has a charge voltage output;
   e. a first electrical current supply means for supplying electrical current having an output connected to the fidl winding and further having a field electrical current sense signal input connected to the armature winding and further having a first pulse width modulated input;
   f. a voltage control means for generating a pulse width modulated signal proportional to a predetermined voltage level having a first pulse width modulated output signal connected to the firs tpulse width modulated input of the first electrical current supply means, wherein the voltage control means also has a predetermined voltage reference, and a dual voltage level input, wherien the dual voltage level input is connected to the first voltage level and the second voltage level so as to adjust the first uplse width modulated output in response to a sensed voltage signal at the dual voltage level input and the predetermined voltage reference;
   g. a solenoid means for switching wherein the solenoid means inlcudes a first input connected to the alternator means charge voltage output, a first switching output connected to the second voltage output circuit, and wherien the solenoid also has a voltage level signal input;
   h. a second electrical current supply means for supplying electrical current to the solenoid means having a voltage level signal output connected to the voltage level signal input of the solenoid means and further including an input;
   i. a voltage lockout means for locking out the first voltage level or the second voltage level having a first voltage level lockout output signal, and a second voltage level lockout output signal; and
   j. a mode switching means having a first input connected to the mode control signal, a second input connected to the first voltage level lockout output signal, a third input connected to the second voltage level lockout output signal, and a solenoid control output connected to the input of the second electrical current supply means, wherein the mode switching means provides a solenoid control signa on the solenoid control output in response to the mode control signal, the first voltage level lockout output signal, and the second voltage level lockout output signal so as to activate the second electrical current supply means to switch the solenoid means such that the charge voltage output is connected to the first voltage output circuit in response to the first state of the mode control signal except when the first voltage level lockout output signal is active, and the charge voltage output is connected to the second voltage output circuit in response to the second state of the mode control signal except when the second voltage level lockout output signal is active.

2. The two state power apparatus of claim 1 wherein the dual voltage level input is temperature compensated to provide an accurate voltage level input regardless of temperature.

3. The two state power apparatus of claim 1 further comprising:
   a. the mode switching means further including a mode priority switching input;
   b. a mode priority means including a first input connected to the first voltage level, a second input connected to the second voltage level and a mode priority output connected to the mode priority switching input wherein the mode priority output is activated when the first voltage level drops below a predetermined level and the mode switching means responds to an active signal on the mode priority control signal on the solenoid control output so as to operate the second electrical current supply means to switch the solenoid to connect the charge voltage output circuit to the first voltage output circuit.

4. The two state power apparatus of claim 1 further comprising a reset drive having an output and an input, wherein the voltage control further comprises a reset line connected to the reset driver output, wherein the dual voltage level input also comprises an open sense detection means with an open sense output signal connected to the reset driver input and wherein when an open circuit is detected on the dual voltage level input the open sense detection means activates the open sense output signal and the reset driver resets the voltage control means in response to the open sense output signal.

5. The two state power apparatus of claim 1 wherein the second electrical current supply means applies a signal to the voltage level signal input of the solenoid means, the applied signal being responsive to the solenoid control output to prevent switching of charge voltage output circuit in the absence of a second voltage level on the second voltage output.

6. The two state power apparatus of claim 1 wherein the alternator means comprises a vehicle alternator.

7. The two state power apparatus of claim 1 wherein the first electrical current supply means comprises a field effect transistor.

8. The two state power apparatus of claim 1 wherein the voltage control means comprises a regulating pulse width modulator.

9. The two state power apparatus of claim 1 wherein the first solenoid comprises a 24 volt solenoid.

10. The two state power apparatus of claim 1 wherein the second electrical current supply means comprises a field effect transistor.

11. The two state power apparatus of claim 3 wherein the mode priority means comprises a 12 volt priority override wherein the the two state power system supplies the first voltage level for a predetermined time period after activation of the mode priority output.

12. The two state power apparatus of claim 1 wherein wherein the voltage lock-out means comprises at least two diodes connected to each other in an opposing configuration.

13. The two state power apparatus of claim 1 wherein the mode switching means comprises a manually controlled switch to substantially change the state of the system from the first voltage level to the second voltage level.

14. The two state power apparatus of claim 1 wherein the the mode control signal is connected to a signal output of a 24 volt power inverter.

15. The two state power apparatus of claim 1 wherein the first voltage level is 12 volts and the second voltage level is 24 volts.

* * * * *

UNITED STATES PATENT AND TRADEMARK OFFICE
CERTIFICATE OF CORRECTION

PATENT NO. : 5,164,655　　　　　　　　　　　　Page 1 of 2

DATED : November 17, 1992

INVENTOR(S) : Frederick D. Heavey

It is certified that error appears in the above-indentified patent and that said Letters Patent is hereby corrected as shown below:

Column 1, Line 49 the word "swich" should be --switch--.

Column 1, Line 56 the word "rives" should be --drives--.

Column 4, Line 17 the number "10" should be --12--.

Column 4, Line 18 the number "12" should be --10--.

Column 7, Line 8 the word "apparatur" should be --apparatus--.

Column 7, Line 20 the word "fidl" should be --field--.

Column 7, Line 27 the words "firs tpulse" should be --first pulse--.

Column 7, Line 34 the word "uplse" should be --pulse--.

UNITED STATES PATENT AND TRADEMARK OFFICE
CERTIFICATE OF CORRECTION

PATENT NO. : 5,164,655

DATED : November 17, 1992

INVENTOR(S) : Frederick D. Heavey

It is certified that error appears in the above-indentified patent and that said Letters Patent is hereby corrected as shown below:

Column 7, Line 41 after the words "output circuit" please insert --and a second switching output connected to a second voltage output circuit--.

Column 7, Line 41 the word "wherien" should be --wherein--.

Column 7, Line 59 the word "signa" should be --signal--.

Column 8, Line 23 after the word "priority" please insert --output by overriding the mode control signal by providing a solenoid priority--.

Column 8, Line 28 the word "drive" should be --driver--.

Column 8, Line 66 please delete the word "wherein".

Signed and Sealed this

Twenty-sixth Day of October, 1993

Attest:

BRUCE LEHMAN

Attesting Officer

Commissioner of Patents and Trademarks